United States Patent Office 3,115,444
Patented Dec. 24, 1963

3,115,444
PROCESS FOR MICROBIAL HYDROXYLATION OF STEROIDS CONTAINING AROMATIC A-RINGS
Allen I. Laskin, Somerset, and Josef Fried, Princeton, N.J., assignors to Olin Mathieson Chemical Corporation, New York, N.Y., a corporation of Virginia
No Drawing. Original application Jan. 22, 1962, Ser. No. 167,946. Divided and this application Nov. 6, 1962, Ser. No. 241,097
5 Claims. (Cl. 195—51)

This application is a division of our application Serial No. 167,946, filed January 22, 1962.

This invention relates to and has for its objects the provisions of an improved process for the hydroxylation of steroids containing an aromatic A-ring and of certain new steroids produced thereby.

It is well known that steroidal ketones possessing either a saturated or partially unsaturated A-ring are readily attacked by a large variety of microorganisms with the formation of a wide variety of chemical entities. In contrast, reports concerning the microbiological transformation of steroids possessing an aromatic A-ring, such as estrone and estradiol, have been scant. It has now been found that if a microorganism of the genus Glomerella is employed, steroids possessing an aromatic A-ring are hydroxylated, thereby yielding a mixture of the corresponding 7α-hydroxyl and 15α-hydroxyl derivatives.

In its broadest aspects, therefore, the process of this invention entails subjecting a steroid containing an aromatic A-ring to the action of enzymes of a microorganism of the genus Glomerella and recovering the products formed. More narrowly, the process of this invention is directed to the subjecting of estrone or estradiol to the action of the enzymes of a microorganism of the genus Glomerella under oxidizing conditions and recovering the steroids formed. The oxidation is preferably effected by either including the steroid in an aerobic culture of the microorganism, or by bringing together in an aqueous medium the steroid, air and enzymes of non-proliferating cells of the microorganism.

In general, the conditions for culturing the Glomerella for the purposes of this invention are (except for the inclusion of the steroid to be converted) the same as those for culturing various microorganisms for the production of antibiotics and/or vitamin $B_{12}$, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid.

The source of nitrogenous factors may be organic (e.g., soybean meal, corn steep liquor, meat extract and/or distillers' solubles) or synthetic (i.e., composed of simple, synthesizable organic or inorganic compounds).

An adequate, sterile air supply should be maintained during the fermentation, for example by the conventional methods of exposing a large surface of the medium to air, or by utilizing submerged aerated cultures. The steroid may be added to the culture during the incubation period, or included in the medium prior to sterilization or inoculation. The culture period may vary considerably, the range of about 6 to 96 hours being feasible, but not limiting.

Among the species of Glomerella which may be utilized in the process of this invention can be mentioned *Glomerella fusaroides*, *Glomerella glycines*, and *Glomerella cingulata*.

Among the steroids which may be hydroxylated in accordance with the process of this invention are those steroids containing an aromatic A-ring. Particularly preferred are the steroids of the estrane series, as exemplified by estrone, estradiol, equilin, 9(11)-dehydroestrone and 8-dehydroestrone. In addition to these steroids, steroids possessing in addition an aromatic B-ring, such as equilenin, and steroids already having additional hydroxyl groups, such as 16α- and 16β-hydroxyestrone and 6α- and 6β-hydroxyestradiol, may also be employed.

The process yields a mixture of the 7α-hydroxy and 15α-hydroxy derivatives of the starting steroid substrate. The mixture may be separated into its component parts in the usual manner, as by solvent extraction, fractional crystallization and chromatography. If estrone is employed as the starting steroid, a mixture consisting predominantly of the known compounds, 7α-hydroxyestrone and 9(11)-dehydro-14-isoestrone, and the new compound of this invention, 15α-hydroxyestrone, is produced. If estradiol is employed as the starting steroid, a mixture of 7α-hydroxyestradiol and 15α-hydroxyestradiol is obtained. Moreover, if estrone is employed as the starting steroid and the process is allowed to proceed for an extended period of time (e.g., one week), in addition to the expected 7α-hydroxyestrone, 15α-hydroxyestradiol is obtained directly.

The new steroids of this invention, obtained either directly from the fermentation procedure described hereinbefore or from the products of such fermentation by subsequent chemical reactions, as more fully described hereinafter, can be represented by the general formula

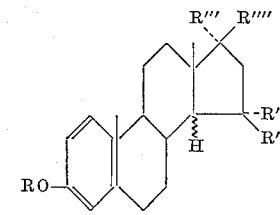

wherein R is hydrogen or the acyl radical of a hydrocarbon carboxylic acid of less than twelve carbon atoms, R' is hydrogen, R" is hydroxy or the acyloxy radical of a hydrocarbon carboxylic acid of less than twelve carbon atoms, or together R' and R" is oxo (keto); R''' is hydrogen, R'''' is hydroxy or the acyloxy radical of a hydrocarbon carboxylic acid of less than twelve carbon atoms, or together R''' and R'''' is oxo (keto); and the hydrogen in the 14-position is in either the alpha or beta position. (In accordance with custom, those compounds containing the hydrogen in the 14-position in the alpha position will be designated as estrone or estradiol derivatives, whereas those compounds containing the hydrogen in the 14-position in the beta position will be designated by the prefix "14-iso.")

As stated hereinbefore, the fermentation process of this invention yields either 15α-hydroxyestrone or 15α-hydroxyestradiol, depending on the length of time of the fermentation. The former can also be converted to the latter chemically by treatment with a reducing agent, such as sodium borohydride. Both 15α-hydroxyestrone and 15α-hydroxyestradiol can be esterified in the usual manner by treatment with an acylating agent such as an acyl chloride or acid anhydride, preferably in the presence of organic base, such as pyridine. The preferred acylating agents are the acyl chlorides and acid anhydrides of hydrocarbon carboxylic acids of less than twelve carbon atoms, as exemplified by the alkanoic acids (e.g., acetic, propionic, butyric, enanthic and lauric acid), the alkenoic acids (e.g., undecenoic acid), the aralkanoic acids (e.g., α-toluic and β-phenylpropionic acid), the cycloalkane carboxylic acids, the cycloalkene carboxylic acids, and the aryl carboxylic acids (e.g., benzoic and c, m, and p-toluic acid).

15α-hydroxyestrone and 15α-hydroxyestradiol can also be oxidized in the usual manner, as by treatment with chromium trioxide, to yield the 15-keto derivatives. In this event the hydrogen in the 14-position is inverted, thereby yielding the 14-iso compounds of this invention (i.e., 15-keto-14-iso-estrone).

Aside from their use as intermediates for forming other compounds of this invention, all of the new compounds of this invention are physiologically active substances possessing estrogenic activity and hence can be used in lieu of known estrogenic agents, such as estradiol valerate, in the treatment of symptoms of the menopause, etc.

The following examples are illustrative of the invention (all temperatures being in centigrade):

EXAMPLE 1

7α-Hydroxyestrone and 15α-Hydroxyestrone

Surface growth from each of five three-week old agar slant cultures of *Glomerella fusaroides*, ATCC 9552 (American Type Culture Collection, Washington, D.C.), the slant containing as a nutrient medium (A): glucose, 10 g.; Difco yeast extract, 2.5; $K_2HPO_4$, 1 g.; agar, 20 g.; and distilled water to 1 l., is suspended in 2.5 ml. of an 0.01% sodium lauryl sulfate aqueous solution. One milliliter portions of the suspension are used to inoculate ten 250 ml. conical flasks, each containing 50 ml. of the following sterilized nutrient medium (B): dextrose, 10 g.; cornsteep liquor, 6 g.; $NH_4H_2PO_4$, 3 g.; Difco yeast extract, 2.5 g.; $CaCl_3$, 2.5; and distilled water to 1 l. After 5 days of incubation at 25° with continuous rotary agitation (280 cycles per minute, 2 inch radius), 10% (vol./vol.) transfers are made to one hundred 250 ml. conical flasks each containing 50 ml. of fresh sterilized medium B. The steroid is added by adding to each flask 0.25 ml. of a sterile solution of the steroid in N,N-dimethylformamide (60 mg./ml.) so that the medium is supplemented with 300 μg./ml. of steroid. After 48 hours of further incubation, the contents of the flasks are pooled and filtered through a Seitz clarifying pad. The flasks, mycelium and pad are washed with successive 50 ml. portions of warm water. The combined filtrate and washings has a volume to 5300 ml.

The combined filtrate and washings are extracted with three 1 l. portions of chloroform. The combined chloroform extracts are washed with water and evaporated to dryness in vacuo. The resulting crude residue (about 654 mg.) on trituration with ethyl acetate furnishes about 290 mg. of a residue, which on recrystallization from methanol furnishes about 153 mg. of 7α-hydroxyestrone.

The ethyl acetate mother liquors from which most of the 7α-hydroxyestrone has been removed are evaporated to dryness in vacuo, taken up in chloroform and the resulting crystals removed by filtration. Concentration of the mother liquors produces additional crystals, a total of about 275 mg. of crystalline material being obtained. Recrystallization of this material from ethyl acetate produces an additional 16 mg. of 7α-hydroxyestrone. Evaporation of the ethyl acetate mother liquors to dryness and crystallization of the residue from chloroform-ethyl acetate furnishes 15α-hydroxyestrone (about 73 mg.), which after additional recrystallization from the same solvent mixture has the following properties: M.P. about 228–230°; $[\alpha]_D^{23} + 202°$ (c. .49 in 95% ethanol);

$\lambda_{max.}^{alc.}$ 281 mμ ($\epsilon = 2290$); $\lambda_{max.}^{2.5\%}$ KOH in methanol 297 mμ ($\epsilon = 3030$); $\lambda_{max.}^{Nujol}$ 3.00, 5.78, 6.19, 6.29, 6.66μ.

Analysis.—Calcd. for $C_{18}H_{22}O_3$ (286.36): C, 75.49; H, 7.74. Found: C, 75.38; H, 7.39.

EXAMPLE 2

Following the general procedure described in Example 1, the fermentation is carried out in two 30 l. fermentation tanks, each containing 19.8 l. of medium (B) adjusted to pH 7.1 with 50% NaOH. After sterilization for 30 minutes at 121°, each tank is supplemented with 9 grams of estrone in 150 ml. of dimethylformamide, and is inoculated with 3 l. of a growing culture of *G. fusaroides*. The fermentation is allowed to proceed at 25° with an air flow of 1.1 cf./m. and an agitation of 220 r.p.m. for 21 hours. After filtration, a total of 34 l. of broth of pH 5.5 is obtained. This filtrate is extracted with chloroform as described in Example 1 and on fractionation yields 7α-hydroxyestrone and 15α-hydroxyestrone.

Subsequent extraction of the filtrate with 2 x 4 l. of methylisobutyl ketone furnishes about 2 g. of material, which is triturated with chloroform and yields about 1.1 grams of a solid material. This material is triturated with acetone and recrystallized from methanol, yielding about 220 mg. of 15α-hydroxyestradiol, M.P. about 248–250°. All the mother liquors from the above 15α-hydroxyestradiol are combined, dissolved in 10 ml. of ethyl acetate and chromatographed on 40 g. of acid washed alumina. From the first 100 ml. of eluate about 355 mg. of crystalline material is obtained which after trituration with chloroform and recrystallization from methanol furnishes about 75 mg. of 9(11)-dehydro-14-isoestrone, M.P. about 250–252° (purple melt); $[\alpha]_D^{23} + 299°$ (EtOH).

The acetate of this material is prepared with acetic anhydride and pyridine: M.P. about 121–122°; $[\alpha]_D^{23} + 260°$ ($CHCl_3$).

EXAMPLE 3

7α-Hydroxyestrone and 15α-Hydroxyestrone

Following the procedure of Example 1 but substituting a culture of *Glomerella glycines*, ATCC 11871, for the *G. fusaroides*, supplementing 80 flasks of the fermentation medium with 500 μg./ml. of steroid instead of 300 μg./ml. and carrying out the final incubation stage for 24 hours instead of 48 hours, there is obtained combined filtrate and washings having a volume of 5020 ml. This solution is extracted with three 1.6 l. portions of chloroform, the combined chloroform extracts filtered and evaporated to dryness in vacuo. The resulting residue (about 390 mg.) on trituration with ethyl acetate furnishes about 134 mg. of crystals which on recrystallization from the same solvent gives about 107 mg. of pure 7α-hydroxyestrone. The ethyl acetate mother liquors from the trituration of the crude residue are taken down to dryness and triturated with chloroform. The solid residue which weighs about 158 mg. is dissolved in ethyl acetate and chromatographed on a column of 8 g. of neutral alumna. Ethyl acetate (500 ml.) elutes crystalline material which after having been triturated with chloroform and recrystallized from ethyl acetate-chloroform furnishes pure 15α-hydroxyestrone, M.P. about 228–230°; identical in all respects with the material obtained in Example 1.

EXAMPLE 4

7α-Hydroxyestrone and 15α-Hydroxyestrone

Following the procedure of Example 1, but substituting *Glomerella cingulata*, ATCC 12097, for the *Glomerella fusaroides*, a mixture of 7α-hydroxyestrone and 15α-hydroxyestrone is obtained, which is separated by the procedure described in Example 1.

EXAMPLE 5

7α-Hydroxyestrone and 15α-Hydroxyestradiol

Following the procedure described in Example 3, but carrying out the final incubation stage for 7 days instead of 48 hours, in ten 2 l. flasks each containing 500 ml. of medium B supplemented with 500 μg. of estrone per milliliter, the combined filtrate and washings have a volume of 6000 ml. This solution is extracted with three 3 l. portions of chloroform and the combined chloroform extracts filtered and evaporated to dryness in vacuo. Fractional crystallization of the resulting residue (about 706 mg.) from ethyl acetate gives as the most insoluble component about 43 mg. of 15α-hydroxyestradiol melting at about 248–250° and identical in all respects with the material described in Example 7. This is followed by several fractions melting at about 252–256° which on recrystallization from ethyl acetate gives about 85 mg. of 7α-hydroxyestrone, M.P. about 258–260°.

An additional amount of 15α-hydroxyestradiol is obtained by extraction of the chloroform-extracted broth with two 1 l. portions of methyl isobutyl ketone. Evaporation of these extracts furnishes about 110 mg. of crystalline material which on crystallization from methanol furnishes about 55 mg. of 15α-hydroxyestradiol melting at about 247–249°.

EXAMPLE 6

15α-Hydroxyestrone 3,15-Diacetate

Sixty-two milligrams of 15α-hydroxyestrone is acetylated with 0.5 ml. of acetic anhydride in 0.5 ml. of dry pyridine at room temperature for 18 hours. Evaporation of the reagents furnishes about 78 mg. of crude material, which on recrystallization from ether-hexane gives about 48 mg. of pure 15α-hydroxyestrone diacetate of the following properties: M. P. about 142–143°; $[\alpha]_D^{23}$ +211° (c. .64 in chlf.);

$\lambda_{max.}^{Nujol}$ 5.65, 5.73, 6.20, 6.68 and 7.95μ

*Analysis.*—Calcd. for $C_{22}H_{26}O_5$ (370.43): C, 71.33; H, 7.08. Found: C, 71.13; H, 7.26.

Similarly, if any other acylating agent, such as propionic anhydride and benzoyl chloride is substituted for the acetic anhydride in the procedure of Example 6, the corresponding 3,15-diester (e.g., the 3,15-dipropionate and 3,15-dibenzoate) is formed.

EXAMPLE 7

15α-Hydroxyestradiol

To a solution of 43 mg. of 15α-hydroxyestrone in 4.5 ml. of methanol is added 45 mg. of sodium borohydride. The reaction mixture is allowed to remain at room temperature for 1 hour, diluted with water, acidified with glacial acetic acid and the methanol evaporated in vacuo. The resulting suspension is extracted with ethyl acetate, the ethyl acetate extract washed with water, dried over sodium sulfate and evaporated to dryness in vacuo. The residue on recrystallization from ethyl acetate furnishes pure 15α-hydroxyestradiol (about 37 mg.) possessing the following properties: M.P. about 248–250° $[\alpha]_D^{23}$ +163° (c. .48 in dioxane);

$\lambda_{max.}^{Nujol}$ 2.90, 3.00, 3.15, 6.15, 6.30 and 7.65μ

*Analysis.*—Calcd. for $C_{18}H_{24}O_3$ (288.37): C, 74.97; H, 8.39. Found: C, 74.91; H, 8.26.

EXAMPLE 8

15α-Hydroxyestradiol 3,15,17-Triacetate

Acetylation of 15α-hydroxyestradiol with pyridine and acetic anhydride as described in Example 6 gives the crystalline triacetate, which after recrystallization from acetonehexane has the following properties: M.P. about 154–156°; $[\alpha]_D^{23}$ +128° (c. 0.60 in CHCl₃);

$\lambda_{max.}^{alc.}$ 257 mμ (ε=770), 266 mμ (ε=755); $\lambda_{max.}^{Nujol}$ 5.65, 5.76, 6.23, 6.32, 6.70, 8.02μ

*Analysis.*—Calcd. for $C_{24}H_{30}O_6$ (414.48): C, 69.54; H, 7.30. Found: C, 69.39; H, 7.32.

Similarly, if any other acylating agent, such as propionic anhydride and benzoyl chloride, is substituted for the acetic anhydride in the procedure of Example 8, the corresponding 3,15,17-triester (e.g., the 3,15,17-tripropionate and the 3,15,17-tribenzoate) is obtained.

EXAMPLE 9

15-Keto-14-Isoestrone

To a solution of 48 mg. of 15α-hydroxyestrone in 2 ml. of acetone is added 1.3 ml. of a solution containing 20 mg. of chromium trioxide and 32 mg. of concentrated sulfuric acid per milliliter of 90% aqueous acetone. The mixture is allowed to remain at room temperature for 30 minutes, following which excess chromium trioxide is reduced by the addition of a few drops of methanol. Chloroform and water are then added, the chloroform layer washed with water, dried over sodium sulfate and evaporated to dryness in vacuo. The residue (about 35 mg.) is dissolved in 4 ml. of ethyl acetate and 4 ml. of hexane and chromatographed on 2 g. of silica gel. Elution with the same solvent mixture (50 ml.) furnishes crystals which after recrystallization from acetone-hexane have the following properties: M.P. about 193–195°; $[\alpha]_D^{23}$ +83.5° (c. .30 in chlf.); +69° (c. .46 in methanol);

$\lambda_{max.}^{alc.}$ 279 mμ (ε=2750); shoulder at 245–250 mμ (ε=3100); $\lambda_{max.}^{2.5\%}$ KOH in Methanol 240 mμ (ε=8300); 277 mμ (ε=15,000); $\lambda_{max.}^{KBr}$ 2.98, 5.66, 5.78, 5.91, 6.20, 6.31 and 6.64μ

The above data refer to the acetone adduct of this compound. The anhydrous compound is obtained on drying at 140°. It melts at about 208–210°.

*Analysis.*—Calcd. for $C_{18}H_{20}O_3$ (284.34); C, 76.03; H, 7.09. Found: C, 76.04; H, 7.03.

15-keto-14-isoestrone can also be obtained by oxidation of 15α-hydroxyestradiol under the above conditions.

The invention may be variously otherwise embodied within the scope of the appended claims.

What is claimed is

1. A process for hydroxylating a steroid of the estrane series containing an aromatic A-ring in one of the positions selected from the group consisting of the 7α-position and the 15α-position, which comprises subjecting such steroid to the action of enzymes of a microorganism of the genus Glomerella.

2. A process for hydroxylating a steroid in one of the positions selected from the group consisting of the 7α-position and the 15α-position, which comprises subjecting a steroid selected from the group consisting of estrone and estradiol to the action of enzymes of a microorganism of the genus Glomerella under oxidizing conditions.

3. A process for hydroxylating a steroid in one of the positions selected from the group consisting of the 7α-position and the 15α-position, which comprises subjecting estrone to the action of enzymes of a microorganism of the genus Glomerella under oxidizing conditions.

4. The process of claim 3 wherein the microorganism is *Glomerella fusaroides*.

5. The process of claim 3 wherein the microorganism is *Glomerella glycines*.

References Cited in the file of this patent

UNITED STATES PATENTS 2,985,563    Carvajal _____ May 23, 1961